United States Patent [19]

Usui

[11] Patent Number: 5,221,823
[45] Date of Patent: Jun. 22, 1993

[54] LASER MACHINING APPARATUS FOR WELDING AND CUTTING

[75] Inventor: Akaru Usui, Aichi, Japan
[73] Assignee: Mitsubishi Denki K.K., Tokyo, Japan
[21] Appl. No.: 821,810
[22] Filed: Jan. 17, 1992
[30] Foreign Application Priority Data
  Jul. 3, 1991 [JP] Japan .................................. 3-162843
[51] Int. Cl.$^5$ ............................................ B23K 26/08
[52] U.S. Cl. .......................... 219/121.78; 219/121.63; 219/121.67; 219/121.84
[58] Field of Search ................. 219/121.78, 121.79, 219/121.6, 121.84, 121.67, 121.72, 121.63, 121.64

[56] References Cited

U.S. PATENT DOCUMENTS

| 4,695,701 | 9/1987 | Monteith et al. | 219/121.79 |
| 4,698,483 | 10/1987 | Marinoni et al. | 219/121.63 X |
| 4,892,992 | 1/1990 | Akeel et al. | 219/121.78 |
| 4,896,015 | 1/1990 | Toboada et al. | 219/121.78 |

FOREIGN PATENT DOCUMENTS 62-130788  6/1987  Japan .

Primary Examiner—C. L. Albritton
Attorney, Agent, or Firm—Sughrue, Mion, Zinn, Macpeak & Seas

[57] ABSTRACT

A laser machining apparatus having a laser oscillator connected to a laser robot by a beam transmitting apparatus made of beam ducts, in which the beam ducts are hermetically sealed between the outlet of the laser oscillator and the laser beam outlet of laser robot, and a working gas supplying inlet is mounted at an upper portion of the beam ducts for transmitting of the gas through the beam ducts and outputting of the gas at a nozzle in the laser robot head. According to the above construction, the present invention is able to prevent an occurrence of the heat lens phenomenon, and also able to prevent fumes and dust from entering into the beam duct.

7 Claims, 6 Drawing Sheets

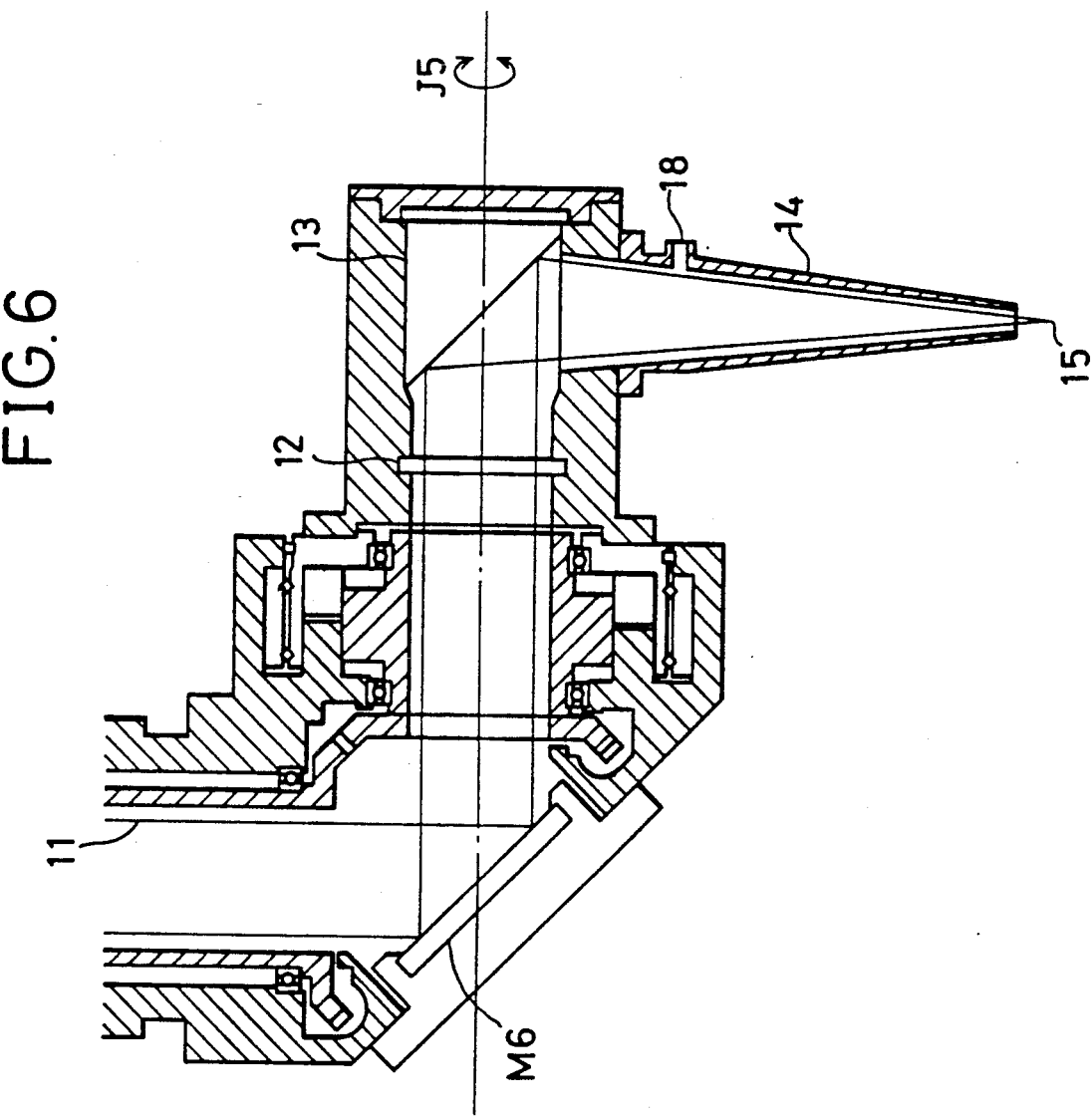

LASER MACHINING APPARATUS FOR WELDING AND CUTTING

BACKGROUND OF THE INVENTION

The invention relates to a laser machining apparatus for welding and cutting a workpiece by means of a laser beam.

A conventional laser machining apparatus is disclosed in the U.S. Pat. No. 4,698,483 (Japanese laid-open publication No. 62-130778).

FIG. 5 shows a perspective view of a conventional laser machining apparatus for welding and cutting the workpiece. In the figure, the laser robot machining apparatus construction is illustrated with an emphasis on the laser beam path.

The construction and operation of the conventional laser robot apparatus will be hereinafter described.

As shown in FIG. 5, a laser robot 1 is constructed with five axial (J1-J5) multi-articulated arms. A laser oscillator 2 generates a laser beam. A beam transmitting apparatus 3 transmits the laser beam generated in the laser oscillator 2 to a laser robot 1. The beam transmitting apparatus 3 is constructed of bend mirrors (BM1, BM2) which change the beam direction, beam ducts (usually cylindrical pipe) which protect the human body from the laser beam and supporting members (not shown) which support the beam ducts. When a laser beam having linearly polarized light is converted into a beam having circularly polarized light in order permit the cutting of a workpiece, a retarder (linear/circular converter) is used as the bend mirror BM1. Ordinarily, a bend mirror BM2 is supported by a light axis regulator. The light axis regulator regulates the angle of the beam in two axis directions, i.e., the up-down, right-left directions, and aligns the laser beam with the light axis of the beam duct. A window lens 12 is mounted on the path of the laser beam and isolates the working gas sprayed from a nozzle 14 and prevents the working gas from entering into the beam duct of the laser robot (see FIG. 6). In this manner fumes or dust generated from the surface of the workpiece during welding may not enter into the beam duct, into the beam transmitting apparatus and into the outlet of the leaser oscillator.

The operation of the conventional device may be hereinafter described with reference to FIG. 5.

The laser beam radiated from the laser oscillator 2 is introduced into the laser robot 1 through the beam transmitting apparatus 3. The direction of the incident laser beam is changed from a horizontal to a vertical direction by a bend mirror M1 mounted at one end of a swivel axis (the J1 axis) on the base of the laser robot 1. The bend mirror M1 is mounted so that the laser beam is incident into the center of the bend mirror M2 that is fixed at the other end of the J1 swivel axis. The bend mirror M2 also is mounted on the end of J2 axis (under arm axis) so that the laser beam is incident into the center of a bend mirror M3 that is fixed at the other end of the J2 axis. The laser beam that is changed in direction at the bend mirror M3 is then sent to the center of a bend mirror M4.

The bend mirror M4 is mounted at a front direction on the J3 axis (upper arm axis) so that the laser beam is incident onto the center of a bend mirror M5 that is fixed at another-location along the J3 axis. Further, the laser beam that is changed in direction at the bend mirror M5 is sent to the center of a bend mirror M6 that is mounted on the J4 axis (wrist rotation axis) in a work head portion 4.

FIG. 6 shows a detailed figure of the work head portion 4, beginning at the wrist axis J4 of the laser robot 1 in FIG. 5. In FIG. 6, laser beam 11 is transmitted to a bend mirror M6 through the beam duct. The bend mirror M6 is a mirror which changes the direction of the laser beam by 90 degrees. A window lens 12 operates so that the laser beam can pass through it, but the working gas can not pass through it. A metal parabolic mirror 13 collects the transmitted laser beam and directs it toward a focus 15 on a workpiece surface. A nozzle 14 sprays the working gas from its tip into the surface of the workpiece. A gas supplying inlet 18 supplies the working gas into the gas nozzle 14.

The operation of wrist axis portion of the robot machine is described hereinafter. The bend mirror M6 is mounted so that the laser beam is transmitted to the center of the parabolic mirror 13 mounted on the J5 axis (wrist shaking axis). Each of bend mirrors M1 to M6 is able to have its angle changed in two axis directions. In order to direct the laser beam toward the focus point 15, a parabolic mirror is generally used for a welding robot while a lens is used for a cutting robot.

It should be understood that in the present embodiment, a parabolic mirror for collecting the laser beam is used because a welding robot machine is described in the embodiment, but that the lens would be applicable to a cutting robot with an appropriate change as noted above. Regarding the welding robot, the window 12 is mounted between the bend mirror M6 and parabolic mirror 13 so that working gas does not flow backward into the beam duct. Further, the gas inlet 18 is mounted downward of the window 12 and supplies working gas to the workpiece through gas nozzle 14.

The conventional laser robot machine has many limitations.

First, fumes or dust will adhere to the surface of the window lens during a cutting and welding operation. Also, the window lens is heated by the laser beam (heat lens phenomenon). As a result the surface of the lens will shift the position of the focus point 15. Under the worst case it becomes difficult to carry out an accurate and consistent welding or cutting of the workpiece.

In the welding robot, the working gas pressure is controlled to be maintained at a low level so that the working point is thoroughly covered by the working gas. Therefore the fumes and dust generated at the surface of the workpiece enter into the beam duct from the tip of the nozzle 14 and adhere to the parabolic mirror 13 and window lens 12. In this case, the laser beam is distorted and attenuated by the influence of the adhered fumes and dust. Also, the absorption of the laser beam will generate heat in the window lens 12 and cause a partial transformation in it, somewhat like the formation of a cataract in the human eye. The partial transformation works as a lens and changes the route of the laser beam. Therefore the focus of the beam is changed or shifted. In the worst case, the window lens 12 will be melted by the heat generated in the lens. As a result, it is necessary to change the window lens frequently, which is very expensive.

Second, the fumes and dust that adhere onto the lens and mirror will decrease the transmission and reflection rates, thereof respectively, and thus the overall transmission efficiency. For preventing the adhesion of the fumes and dust, an air purge operation is carried out using a washing gas (for example, clean air) in the conventional laser robot machine. However, the air purging equipment is expensive and its operating costs are very high.

SUMMARY OF THE INVENTION

It is a primary object of the present invention to provide a laser machining apparatus having a laser oscillator for generating a laser beam, a laser robot for welding and cutting a workpiece by means of a transmitted laser beam, and a beam transmitting apparatus for transmitting the laser beam to the laser robot, the improvement to the laser machining apparatus comprises a beam duct which is hermetically sealed between the outlet of the laser oscillator and the laser beam outlet of the laser robot. A further feature is the use of a non-window lens in the beam duct. Yet another feature is the design of the robot is that a gas supplying inlet is mounted at an upper portion of the beam duct.

BRIEF DESCRIPTION OF THE DRAWING

FIG. 6 shows a detail construction of a work head portion of the conventional laser robot apparatus.

DETAILED DESCRIPTION OF THE PREFERRED EMBODIMENTS

Figure 1:
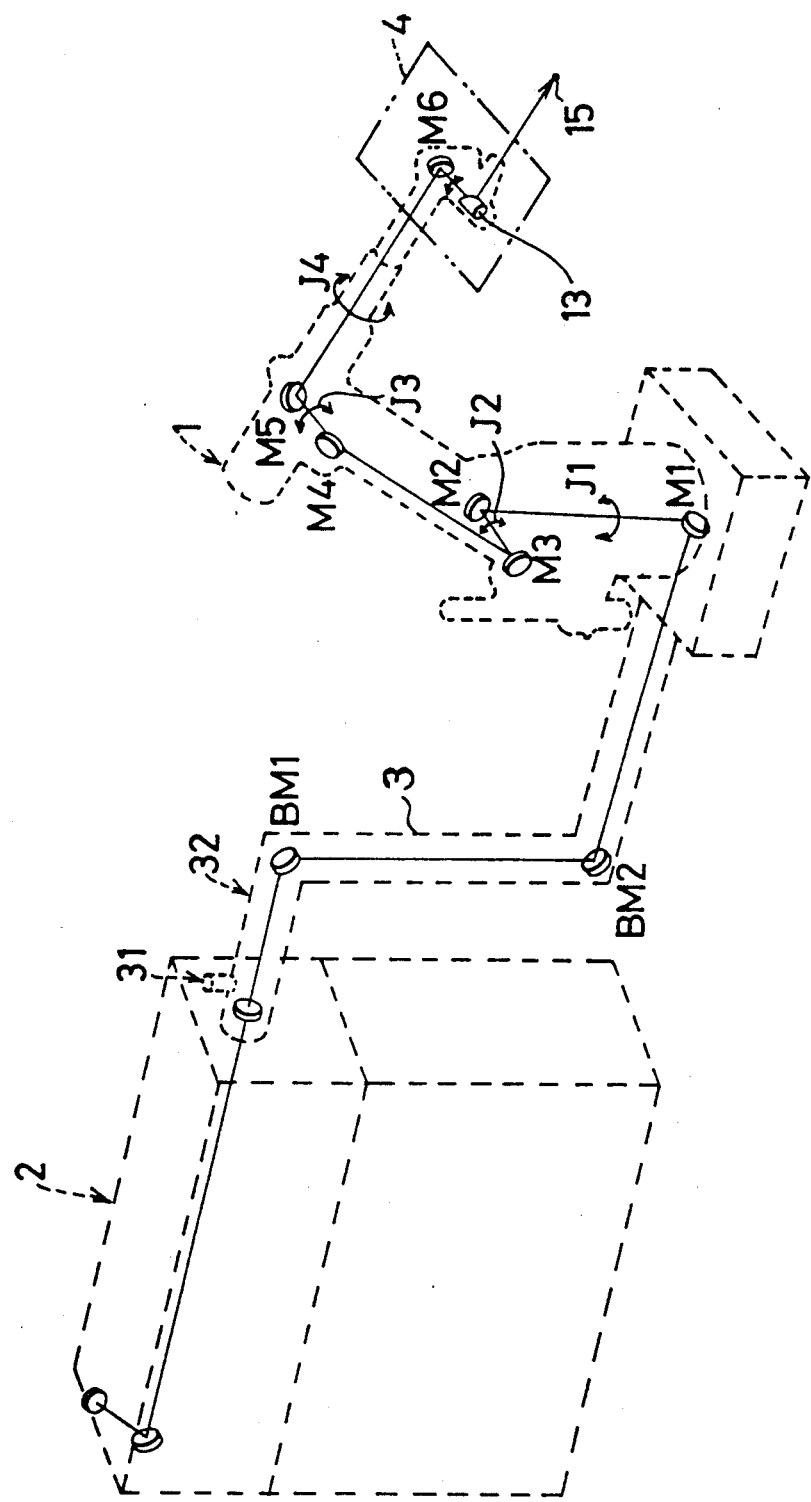
FIG. 1 is a perspective view of a laser beam robot apparatus embodying the present invention.

FIG. 1 is a perspective view of a laser machining apparatus embodying the present invention. In FIG. 1, a laser oscillator 2 generates a laser beam and a beam transmitting apparatus 3 transmits the laser beam generated in the laser oscillator 2 to a laser robot 1. The beam transmitting apparatus 3 is constructed of bend mirrors (BM1, BM2) which change the beam direction, connected beam ducts which protect the human body from the laser beam, and support members (not shown) which support the beam ducts. A gas supplying inlet 31 is mounted upward of the beam transmitting apparatus 3 and supplies a working gas into the first of the connected beam ducts of the beam transmitting apparatus 3.

A laser beam generated in the laser oscillator 2 passes through the beam duct and the bend mirrors in the laser robot and reaches the focus 15 of the workpiece after being concentrated using a parabolic mirror. In the present embodiment there are two novel features compared with the conventional design.

Figure 2:
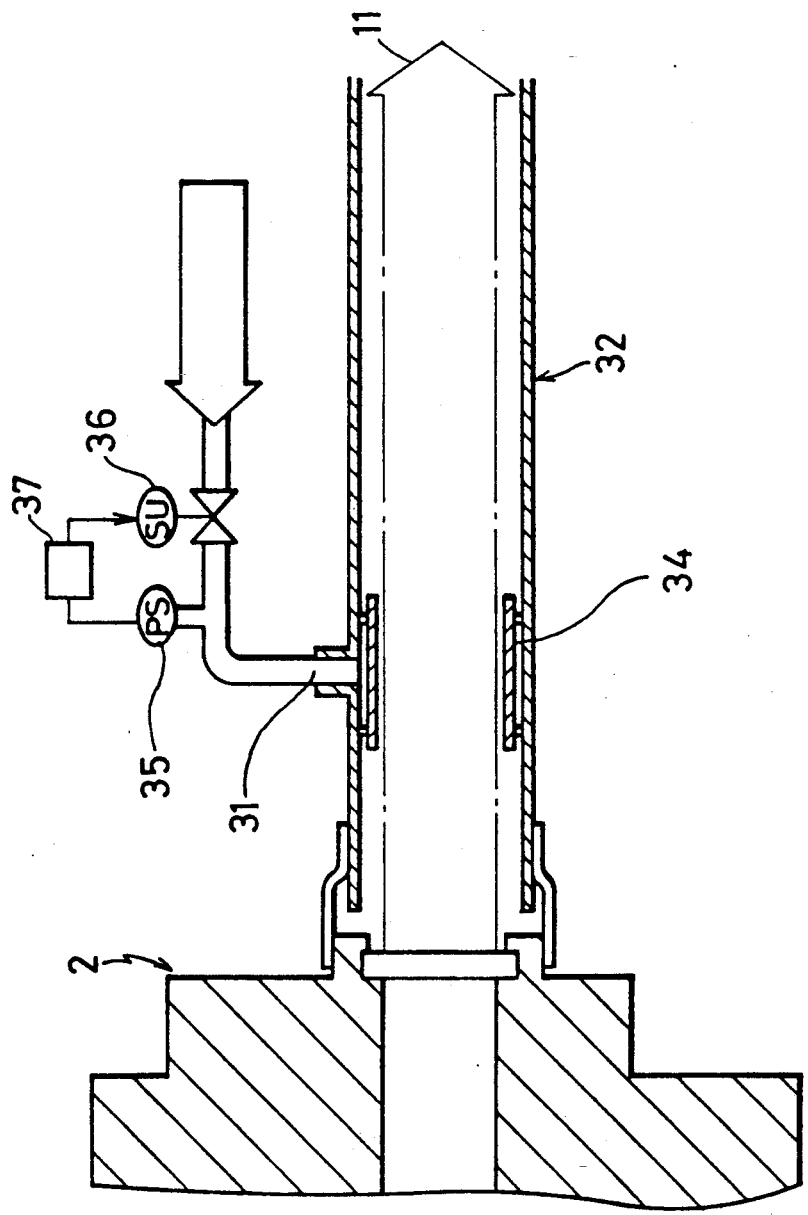
FIG. 2 shows a enlarged view of gas supplying potion where the working gas is supplied into a laser duct in the beam transmitting apparatus
Figure 3:
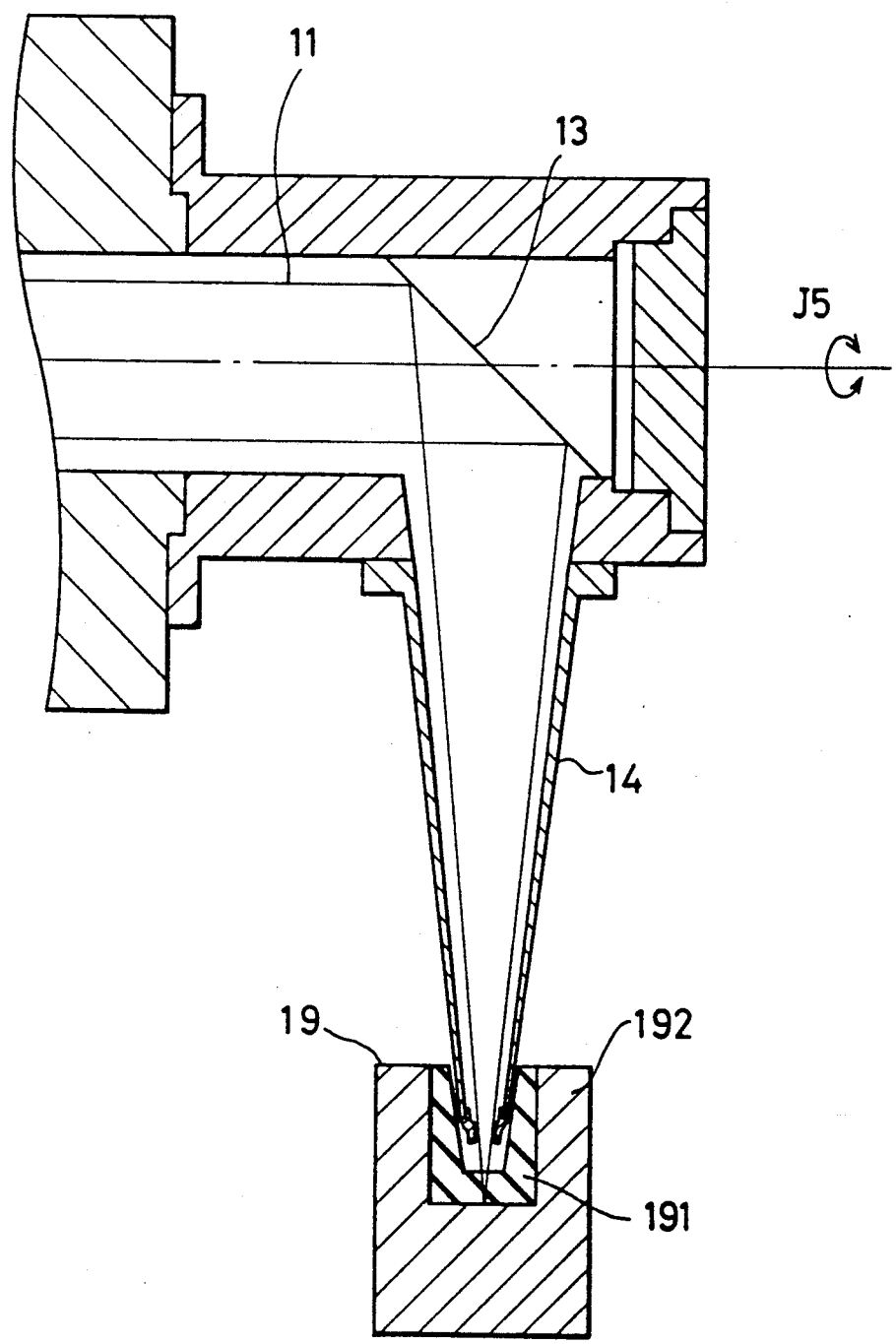
FIG. 3 shows a construction view of a stop plug which cuts off the working gas at the gas nozzle of the work head.

One feature as seen in FIG. 3 is that there is no window in the beam ducts near the gas nozzle 14 of the laser robot. The other feature is that gas supplying inlet is mounted near the output of the laser oscillator 2 as seen in FIG. 2. By removing the window 12 from the laser beam ducts, there is no heat lens phenomenon. As a result, the laser beam always will be focused on the focus point 15 on the workpiece. Thereby laser machining is to be constantly executed in a steady state. As would be apparent, if the window in the duct is merely taken away, fumes and dust generated from the workpiece could travel backward with the working gas into the beam ducts. As a result, the fumes and dust could adhere to the bend mirrors or to the lens in front of the laser oscillator 2.

In the present embodiment, to prevent the adherence of fumes and dust to the mirrors or lens, all beam ducts are hermetically sealed between the laser oscillator and the robot head, including ducts in the laser robot 1. A gas supplying inlet 31 is mounted in the first duct near the laser outlet. The working gas is supplied from the gas supplying inlet 31 into the first beam duct 32, goes through the first beam duct 32 and all subsequent ducts including ducts in the laser robot 1, and is supplied to the work head portion 4.

By controlling the working gas supplied to the beam duct so that the gas pressure in the duct is higher than the pressure in the work head portion 4, the fumes or dust are not able to go backward into the laser beam duct. As a result, fumes or dust can not adhere to the bend mirrors in the ducts and lens at the outlet of the laser oscillator 2.

FIG. 2 shows a enlarged view of a gas supplying potion where the working gas is supplied into the laser beam duct. If the working gas flows forcibly from the gas supplying inlet 31 into central portions of the beam duct 32, the continuity of the laser beam transmission is disturbed. Therefore the laser beam cannot be focused into the focus 15 on the workpiece. To prevent this phenomenon, a gas shunt board 34 is mounted inside of the beam duct 32. The gas shunt board 34 changes the working gas flow. As a result, the continuity of the laser beam is not disturbed as the working gas flows from the gas supplying inlet 31 toward work head 4 of the laser robot 1 without disturbing the laser beam.

In general, when the laser beam is transmitted through the beam ducts, a part of the laser beam hits the beam ducts and heats them. For maintaining the high accuracy of the laser robot machine (especially for a thick workpiece), the beam ducts are cooled by fresh air purging.

In the present embodiment, the working gas is supplied from the gas supplying inlet 31 and cools the beam ducts as the working gas flows in the beam duct 32 and the beam ducts in the laser robot 1.

Further, the working gas supplied from the gas supplying inlet 31 blows onto the workpiece through the gas nozzle 14 of the work head 4 and prevents the fumes and dust from entering into the gas nozzle 14. If the working gas must be flowing even through the laser robot machine is not working, the running cost is extremely expensive. Therefore it is necessary to stop the working gas while the laser robot machine is not working, in order to save costs.

FIG. 3 shows a construction view of a stop plug 19 which cuts off the working gas at the gas nozzle 14 of the work head 4. In the construction of the stop plug 19 there is a stop plug pedestal 192 and a stop plug rubber portion 191. The working gas is stopped by the stop plug rubber portion 191 which forms a seal around the outside of the nozzle and the nozzle outlet and prevents the working gas from leaking outside. The stop plug may be located at a waiting point (separated from the robot frame) of the gas nozzle 14.

Figure 4:
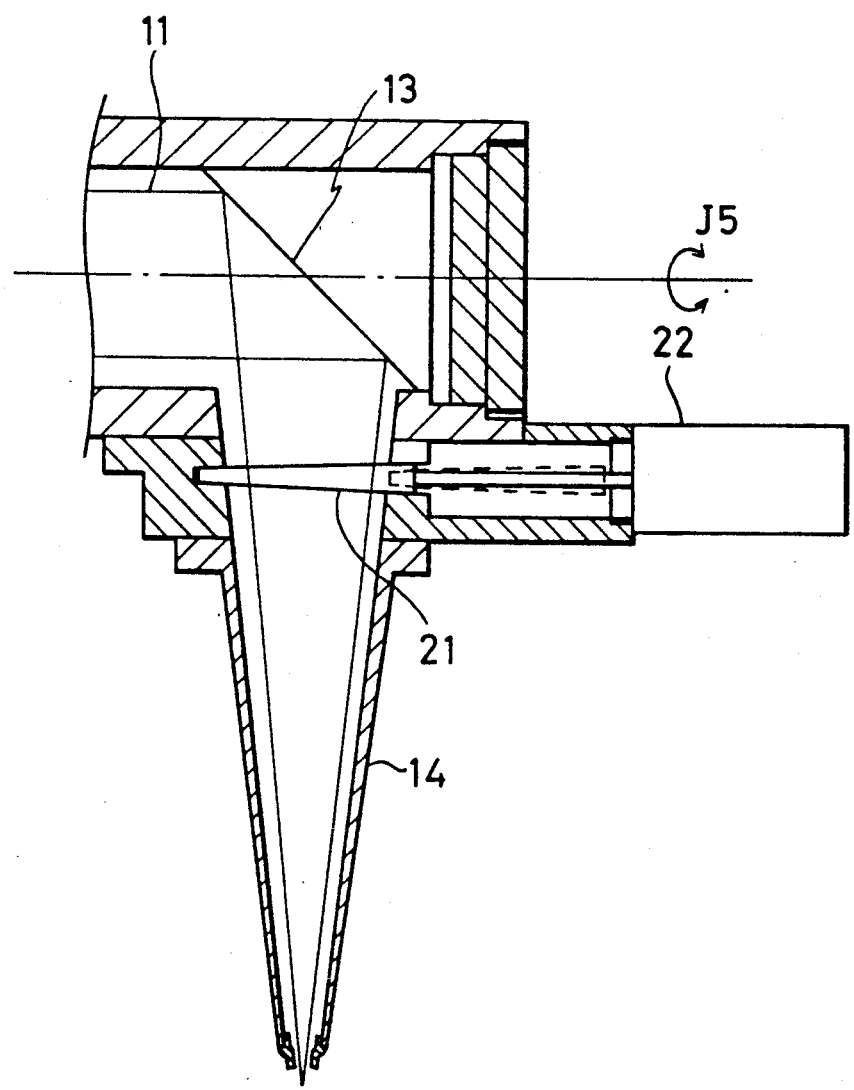
FIG. 4 shows a construction view of a stop valve which cuts off the working gas at the work head.
Figure 5:
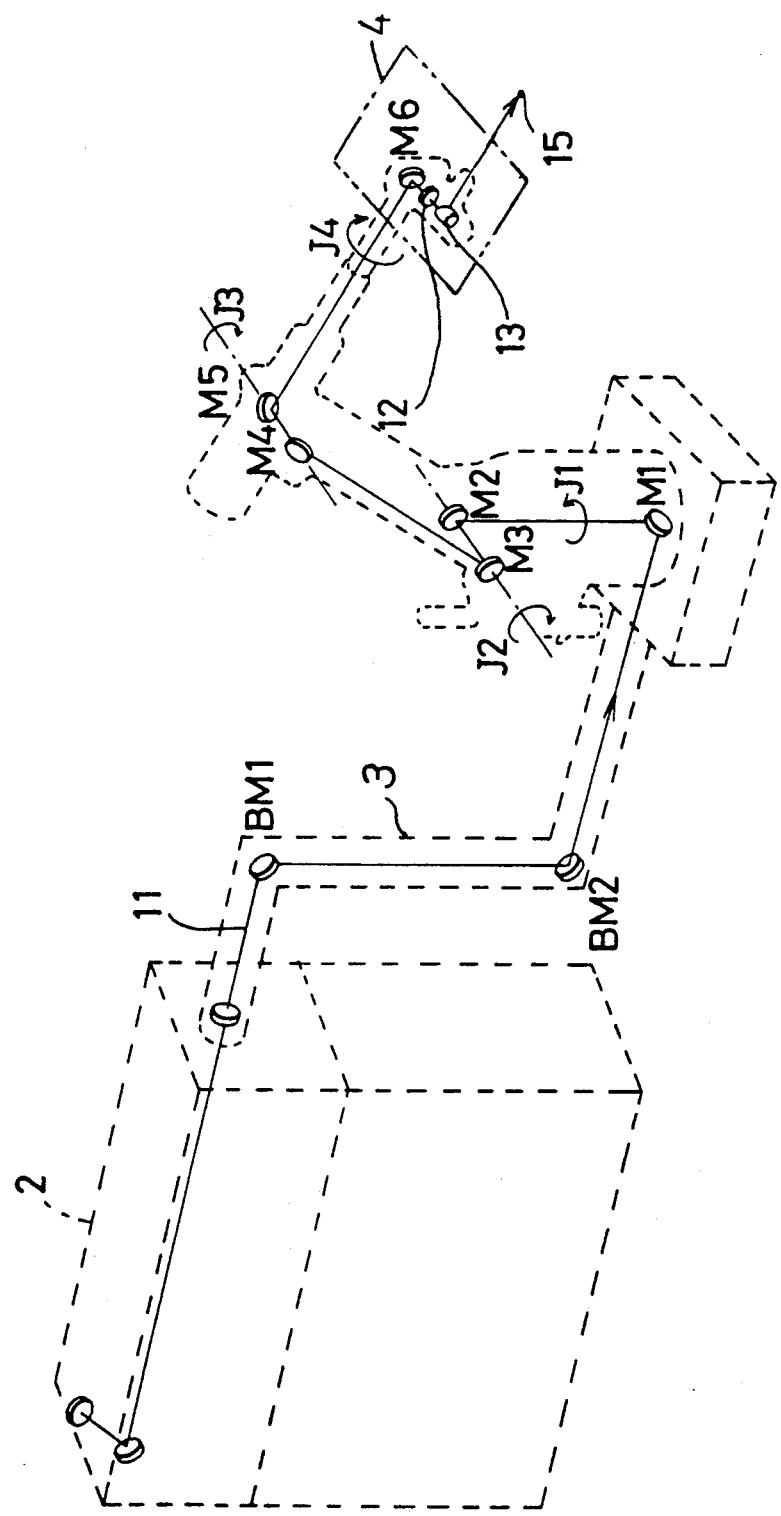
FIG. 5 shows a perspective view of a conventional laser robot apparatus.

FIG. 4 shows another construction of a stop valve which cuts off the flow of the working gas at the work head 4. The flow of the working gas is stopped at the stop valve 21 which is driven by the air cylinder 22. When the stop valve 21 is pushed into the gas nozzle 14, the working gas is stopped from flowing out of the tip of the gas nozzle 14 to the workpiece.

Further both of the apparatus shown in FIG. 3 and FIG. 4 are intended to stop the working gas at the tip of the gas nozzle 14. In FIG. 4, if the stop valve 21 is mounted far from the tip of the gas nozzle 14, the machining rise time will be long because the air that enters the tip of the gas nozzle 14 must be evacuated before operation.

If the flow of air is stopped by the stop valve 21 or stop plug 19, while the machining is not carried out, the pressure of the working gas will increase. A pressure sensor 35 in FIG. 2 detects the increased pressure in the beam duct 32. A control apparatus 37 controls an electromagnetic valve 36 so that the working gas supply is stopped when the pressure of the gas sensor 35 becomes more than a predetermined value.

On the other hand, when the beam duct is hermetically sealed, the control apparatus 37 is able to control the inner pressure of the beam ducts to be a little higher than the outside pressure by detecting the inner pressure using the pressure sensor 35. The above construction prevents the fumes and dust from entering into the beam ducts.

What is claimed is:

1. A laser machining apparatus having a laser oscillator for generating a laser beam, a laser robot having a nozzle for machining a workpiece with the laser beam, and a beam transmitting apparatus for transmitting the laser beam to a beam outlet of said nozzle, comprising:

beam duct means comprising at least one beam duct, having an upper portion which is coupled to said laser oscillator, said beam duct means extending between said laser oscillator and said nozzle, said beam duct means being hermetically sealed along its length and being open internally between an outlet of said laser oscillator and said beam outlet of said nozzle; and a gas supplying inlet located in said upper portion of said beam duct.

2. The laser machining apparatus of claim 1, wherein the pressure of a working gas at said gas supplying inlet is higher than the pressure of the working gas at said beam outlet of said laser robot nozzle.

3. The laser machining apparatus of claim 1, further comprising:

a pressure sensor for detecting pressure in said beam duct;

a working gas controlling valve for controlling the supply of a working gas to said gas supplying inlet; and a control apparatus for controlling said working gas controlling valve so that an inner pressure within the beam duct is higher than an outside pressure of said beam duct based upon an output of said pressure sensor.

4. The laser machining apparatus of claim 3, wherein said control apparatus controls said working gas controlling valve so that the supply of said working gas is stopped when said inner pressure of said working gas becomes higher than a predetermined value.

5. The laser machining apparatus of claim 1, further comprising:

stop plug means for cutting off the flow of said working gas at the tip of said nozzle of said laser robot.

6. The laser machining apparatus of claim 1, further comprising:

stop valve means mounted in said nozzle for cutting off the flow of said working gas at said tip of said nozzle.

7. The laser machining apparatus of claim 1, further comprising:

gas shunt board means mounted inside of said beam duct for changing the flow of said working gas without causing the laser beam to change its direction.

* * * * *